(No Model.)

A. HATHERELL.
WATERING DEVICE FOR TRANSPLANTING MACHINES.

No. 438,155. Patented Oct. 14, 1890.

Witnesses,
Belle A. Rolston
A. E. Tanberg

Inventor,
Albert Hatherell
E. R. Inman,
Attorney.

UNITED STATES PATENT OFFICE.

ALBERT HATHERELL, OF JANESVILLE, WISCONSIN.

WATERING DEVICE FOR TRANSPLANTING-MACHINES.

SPECIFICATION forming part of Letters Patent No. 438,155, dated October 14, 1890.

Application filed February 28, 1890. Serial No. 342,134. (No model.)

*To all whom it may concern:*

Be it known that I, ALBERT HATHERELL, of the city of Janesville, in the county of Rock and State of Wisconsin, have invented new and useful Improvements in Watering Devices for Transplanting-Machines; and I do hereby declare the following to be a full, clear, and exact description of said invention, reference being had to the accompanying drawings, and to the letters or figures of reference marked thereon, which form a part of this specification.

My invention relates to improvements in watering devices for transplanting-machines and will be understood from the following specification, reference being made to the accompanying drawings, in which—

Figure 1:
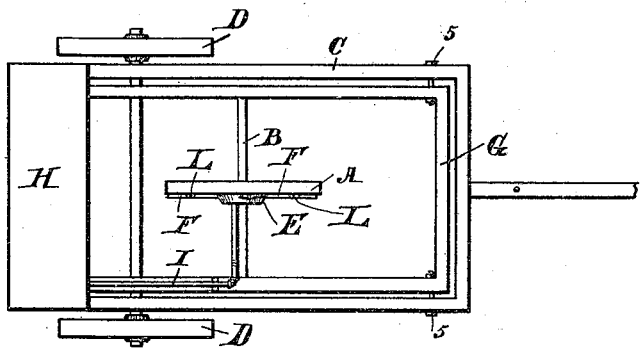
Figure 2:
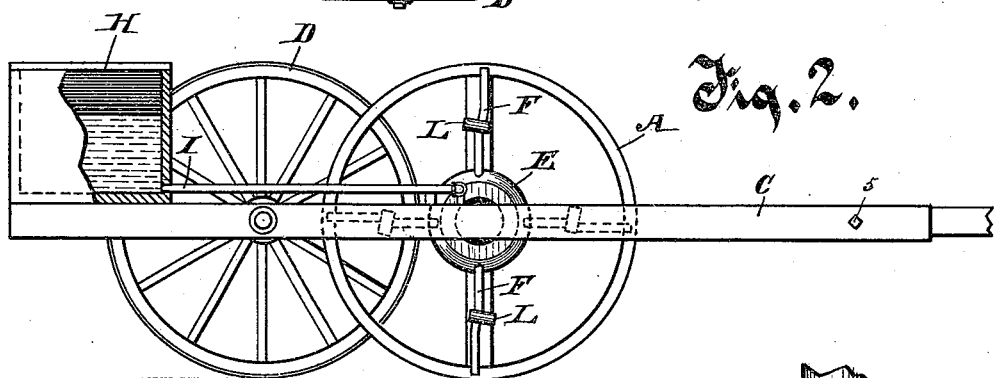
Figure 3:
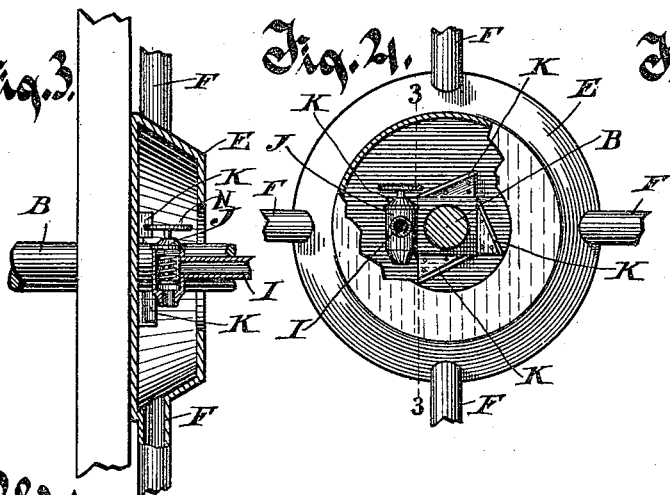
Figure 4:
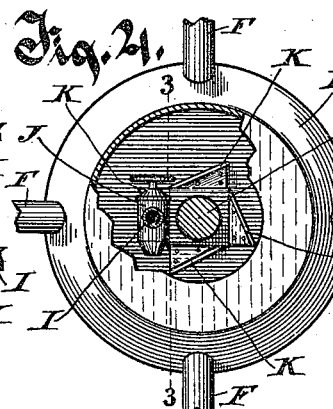
Figure 5:
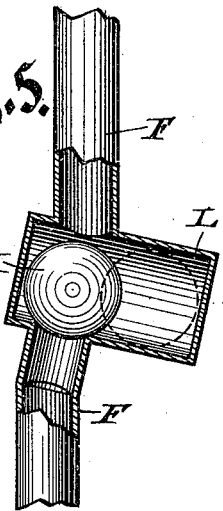

Figure 1 is a plan view. Fig. 2 is a right-side elevation with wheel D, as shown in Fig. 1, removed to show other parts more fully. Figs. 3, 4, and 5 are details.

The same reference-letters refer to identical parts in all the views.

The object of my invention is to provide a means of watering or moistening the ground at regular intervals in or upon which plants—such as tobacco-plants, cabbage-plants, &c.—are to be reset or transplanted, which I do by means of a reservoir E, located at the center of a wheel A, from which reservoir pipes F lead or radiate nearly or quite to the circumference of said wheel A, and by means of which pipes water is directed to a spot upon the ground as said pipes in the course of the revolution of the wheel A are brought downward to a vertical position below the reservoir. The pipes F, are preferably constructed of tin or sheet metal, though they may be constructed of rubber or lead, and are attached to the spokes of said wheel A and extend nearly to the periphery of said wheel.

The reservoir E, which is constructed of tin or sheet metal, is attached to the center of wheel A and is shown in detail in Fig. 4, a part being broken away to expose other parts to view. Fig. 3 is a section of Fig. 4 on dotted lines 3 3.

The wheel A, which is caused to revolve by contact with the ground, is supported upon a shaft B, to which it is permanently fixed, and which in turn is supported in the frame G, which is attached to an outer or main frame C by means of bolts 5 5, whereby the frame G is permitted to move up and down when wheel A passes over depressions or ridges in or upon the ground upon which the machine is being operated, thereby overcoming any difficulty which might occur by reason of an uneven surface of the ground and causing the wheel A to rotate steadily, also permitting said wheel to be raised from contact with the ground when the machine is being turned around at the ends of the field. The frame G being attached to frame C by bolts 5 5, and being otherwise disconnected therefrom, is permitted to move up and down freely, said bolts 5 5 acting as hinges. To facilitate this upward and downward movement of wheel A, pipe I, for a short distance from tank H, is preferably constructed of rubber, and where said pipe leads along the axle B of wheel A it is constructed of metal and clasped loosely to said axle B, by which arrangement said pipe I and valve J are made to always retain the same relative position to the lugs K, and the action of valve J is not interfered with by reason of said upward and downward movement of wheel A.

The frame G and the method of attaching same to frame C not being a part of my invention, I do not wish to limit myself to that particular mode of construction; but wheel A may be placed directly in frame C, all of which mechanism is carried upon the wheels D D, as shown in Fig. 1.

The reservoir E is supplied with water from a tank H, located upon the rear of the main frame, by means of a pipe I, leading from said tank and into the reservoir E. To prevent a constant flow of water through pipe I and to cause the required amount only to flow therefrom, I place upon the end of pipe I and within the reservoir E a valve J, which is the ordinary form of lift-valve, having upon the upper end of the stem thereof an enlarged head or disk N. Valve J in its natural position is closed, as shown in Fig. 3, and water is thereby prevented from flowing through the pipe I into the reservoir E. For the purpose of opening said valve, so that water may flow into the reservoir E, as required, I place upon the inner wall of said reservoir cams K, corresponding in number to the number of discharge-pipes F leading from the reservoir.

The end which is uppermost of cams K as the wheel A revolves comes in contact with the under side of the head or disk N on the upper end of the stem of valve J and raises the same, opening the valve J and permitting water to flow from the tank H through the pipe I and valve J into the reservoir E, and as cam K is carried on by the revolution of the wheel A it passes from under the disk N, releasing the same and permitting the valve to close, arresting the flow of water therefrom. By reason of the opening of the valve J, as described, the reservoir E is supplied and partially filled with water, from which it flows through one of the pipes F when it arrives at a vertical position below the reservoir to the ground, thereby moistening a spot upon the ground where a plant may be set.

To prevent the water from flowing through the pipe too soon by reason of gravity as said pipe commences to descend below the horizontal plane, I place in the pipes F valves L, (shown fully in Fig. 5,) consisting of a short cylindrical chamber considerably larger in diameter than the pipe in which it is placed, in which chamber I place a ball M, made of rubber or other suitable material, sufficiently large to nearly fill the chamber of valve L, wherein it moves freely. The cylindrical chamber of valve L is placed in the pipe F, so that the longitudinal line thereof would form an angle of about sixty degrees with the longitudinal line of said pipe F. As pipe F commences to descend to the ground, the ball M rolls of its own gravity into the orifice of the lower pipe and remains there until the pipe arrives at nearly a vertical position and the lower end thereof is nearly at the tangent-point marked by the ground-line upon the circumference of the wheel A, when said ball M of its own gravity rolls out of the orifice in which it rests and occupies a position in the chamber of the valve, as shown by dotted lines in Fig. 5, and permits the water to flow through the pipe F to the ground, thus accomplishing the object of my device.

What I claim as new, and desire to secure by Letters Patent, is—

1. In a watering device for a transplanting-machine, a reservoir E, with pipes F F F F radiating therefrom, in combination with a wheel A and located thereupon in the manner and for the purpose specified.

2. In a watering device for a transplanting-machine, a tank H, pipe I, and valve J, in combination with a reservoir E, located upon a wheel A, with pipes F F F F radiating therefrom and along the spokes of said wheel, substantially as described.

3. In a watering device for a transplanting-machine, the tank H, pipe I, and valve J, in combination with a revolving reservoir E, located upon a wheel having lugs K located upon the inner wall of said reservoir for the purpose of actuating valve J, substantially as set forth, and for the purpose specified.

4. In a watering device for a transplanting-machine, the combination of the wheel A, reservoir E, and pipes F, radiating from said reservoir to the circumference of said wheel, with the valve L, consisting of the cylindrical chamber and ball M, moving freely in said chamber, said valve being located in said pipes F, operating as described, and for the purpose set forth.

In testimony whereof I affix my signature in the presence of two witnesses.

ALBERT HATHERELL.

Witnesses:
B. A. ROLSTON,
A. E. TANBERG.